United States Patent
Bertolini

(10) Patent No.: US 10,964,127 B2
(45) Date of Patent: Mar. 30, 2021

(54) METHOD AND APPARATUS FOR MANAGED VEHICULAR TOLL PAYMENTS

(71) Applicant: FORD GLOBAL TECHNOLOGIES, LLC, Dearborn, MI (US)

(72) Inventor: Caio Vinicius Bertolini, Lauro de Freitas (BR)

(73) Assignee: Ford Global Technologies, LLC, Dearborn, MI (US)

( * ) Notice: Subject to any disclaimer, the term of this patent is extended or adjusted under 35 U.S.C. 154(b) by 114 days.

(21) Appl. No.: 15/870,454

(22) Filed: Jan. 12, 2018

(65) Prior Publication Data

US 2019/0221048 A1    Jul. 18, 2019

(51) Int. Cl.
| | |
|---|---|
| *G07B 15/02* | (2011.01) |
| *G07B 15/06* | (2011.01) |
| *G06Q 20/12* | (2012.01) |
| *G07C 1/00* | (2006.01) |
| *H04W 4/44* | (2018.01) |
| *G06Q 20/32* | (2012.01) |
| *H04W 4/021* | (2018.01) |

(52) U.S. Cl.
CPC ......... *G07B 15/063* (2013.01); *G06Q 20/127* (2013.01); *G06Q 20/3224* (2013.01); *G07C 1/00* (2013.01); *H04W 4/021* (2013.01); *H04W 4/44* (2018.02)

(58) Field of Classification Search
CPC ...... G07B 15/063; H04W 4/44; H04W 4/021; G06Q 20/3224; G06Q 2240/00; G06Q 20/085; G06Q 20/10; H04L 67/12; H04L 67/18

USPC ........................................ 235/384, 380, 375
See application file for complete search history.

(56) References Cited

U.S. PATENT DOCUMENTS

| | | | |
|---|---|---|---|
| 6,339,384 B1 | 1/2002 | Valdes-Rodriguez | |
| 7,262,711 B2 | 8/2007 | Zhu et al. | |
| 9,721,397 B2 | 8/2017 | Gordon et al. | |
| 2009/0306890 A1* | 12/2009 | Yoshida | G01C 21/005 701/423 |
| 2013/0201011 A1* | 8/2013 | Nieuwland | G07B 15/063 340/425.5 |
| 2014/0058805 A1 | 2/2014 | Paesler et al. | |
| 2014/0100930 A1* | 4/2014 | Lopez | G06Q 30/0222 705/14.23 |
| 2015/0100394 A1* | 4/2015 | Povolny | G07B 15/063 705/13 |
| 2015/0233727 A1* | 8/2015 | Roelle | G01C 21/3697 701/533 |
| 2016/0202069 A1* | 7/2016 | Wippler, III | G01C 21/3453 701/400 |
| 2016/0356611 A1* | 12/2016 | Glasgow | H04L 67/12 |
| 2017/0113619 A1 | 4/2017 | Boehm et al. | |
| 2017/0115126 A1* | 4/2017 | McMaster | G06Q 30/0215 |

(Continued)

*Primary Examiner* — Thien M Le
(74) *Attorney, Agent, or Firm* — Michael Spenner; Brooks Kushman P.C.

(57) ABSTRACT

A system includes a processor configured to receive a navigation route. The processor is further configured to identify a toll instance on the navigation route. The processor is additionally configured to display the toll instance with a preferred payment method on a display. Also, the processor is configured to detect when a vehicle travels past a point where a toll is due for the toll instance and wirelessly instruct payment of the toll using the preferred payment method.

12 Claims, 4 Drawing Sheets

(56) References Cited

U.S. PATENT DOCUMENTS

2017/0127230 A1* 5/2017 Enriquez ................. G08G 1/207
2018/0061143 A1* 3/2018 Nelson .................... G06F 16/29
2018/0293595 A1* 10/2018 McMaster ............... H04L 67/10

* cited by examiner

METHOD AND APPARATUS FOR MANAGED VEHICULAR TOLL PAYMENTS

TECHNICAL FIELD

The illustrative embodiments generally relate to methods and apparatuses for managed vehicular toll payments.

BACKGROUND

Toll payments are a regular part of many drivers' daily commutes. These systems used to require currency payments, but improvements over the years have made it possible to use wireless payment solutions in order to pay tolls. Typically, this involves mounting a radio frequency tag, associated with a user account, in a vehicle window or somewhere on a vehicle. When the vehicle passes a checkpoint, the tag transmits an ID, usable to charge the user account associated with the tag.

With the advent of vehicle wireless technology, such communication could be handled by built-in vehicle systems. Further, if a vehicle is a shared vehicle or a shared autonomous vehicle, the prospect of linking an account to a mounted tag is not necessarily desirable, because payments would then have to be coordinated to a user (whoever was using the vehicle at the time) account.

Another issue with mounted RF tag payments occurs when a user is reimbursed for business expenses. If the user has two tags, both could get charged, if the user has a business tag, then the business may need to charge the user for uses outside business purposes, and if the user has a personal tag, then the user may need to charge the business for uses while on business travel. All of these scenarios lead to situations whereby the advanced, but still dated, model of RF tags in vehicles for toll payment can cause difficulties for users.

SUMMARY

In a first illustrative embodiment, a system includes a processor configured to receive a navigation route. The processor is further configured to identify a toll instance on the navigation route. The processor is additionally configured to display the toll instance with a preferred payment method on a display. Also, the processor is configured to detect when a vehicle travels past a point where a toll is due for the toll instance and wirelessly instruct payment of the toll using the preferred payment method.

In a second illustrative embodiment, a computer-implemented method includes using a predefined, digital payment method, stored on a device computer, to instruct payment of the toll, responsive to determining that a vehicle has traveled past a point where a toll is due, the method including determining which of a plurality of digital payment methods to use based on parameters associated with each of the digital payment methods.

In a third illustrative embodiment, a non-transitory computer-readable storage medium stores instructions that, when executed by a processor, cause the processor to perform a method including presenting a route with a plurality of toll instances identified therewith. The method also includes presenting projected costs associated with each toll instance. The method further includes receiving user-designation of payment sources to be associated with each toll instance and using the designated payment source associated with a given instance to pay a toll associated with the instance as a vehicle passes a point where a toll is due.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
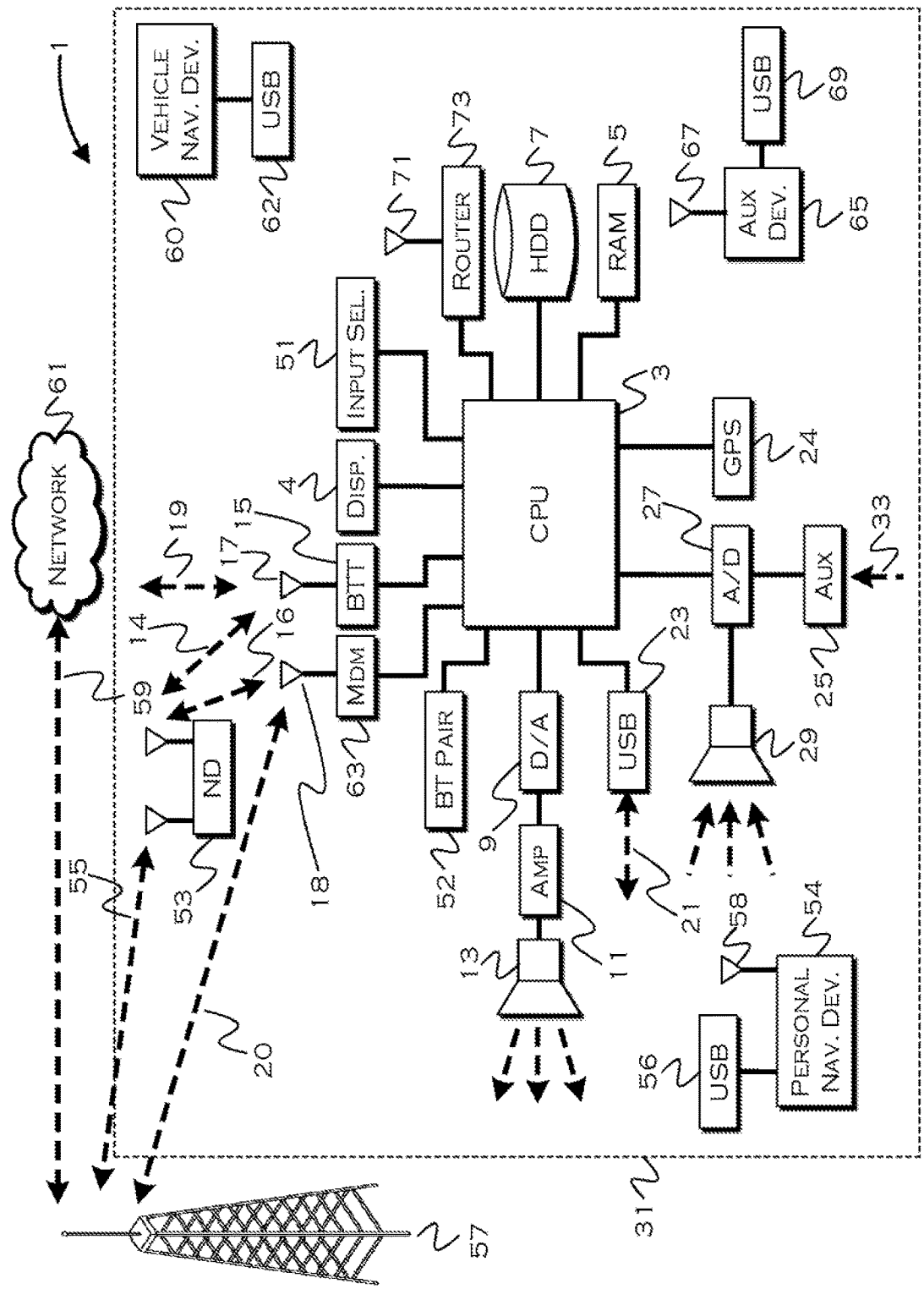
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output.

The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Modern toll booths are often equipped to handle most forms of payment, from credit cards, to currency, to wireless payment through RF devices. There are a number of reasons why a user might prefer varied payment types, such as business/personal hours, limited funds from a given source, lack of currency or a variety of other reasons. The illustrative embodiments allow a user to consolidate digital payment sources and even designate and assign payment types by time, day, location, etc. This provides a comprehensive payment management solution for tolls, which can both speed up user interactions and create easy allocations of tolls between multiple sources (e.g., a business account and a personal account).

Figure 2:
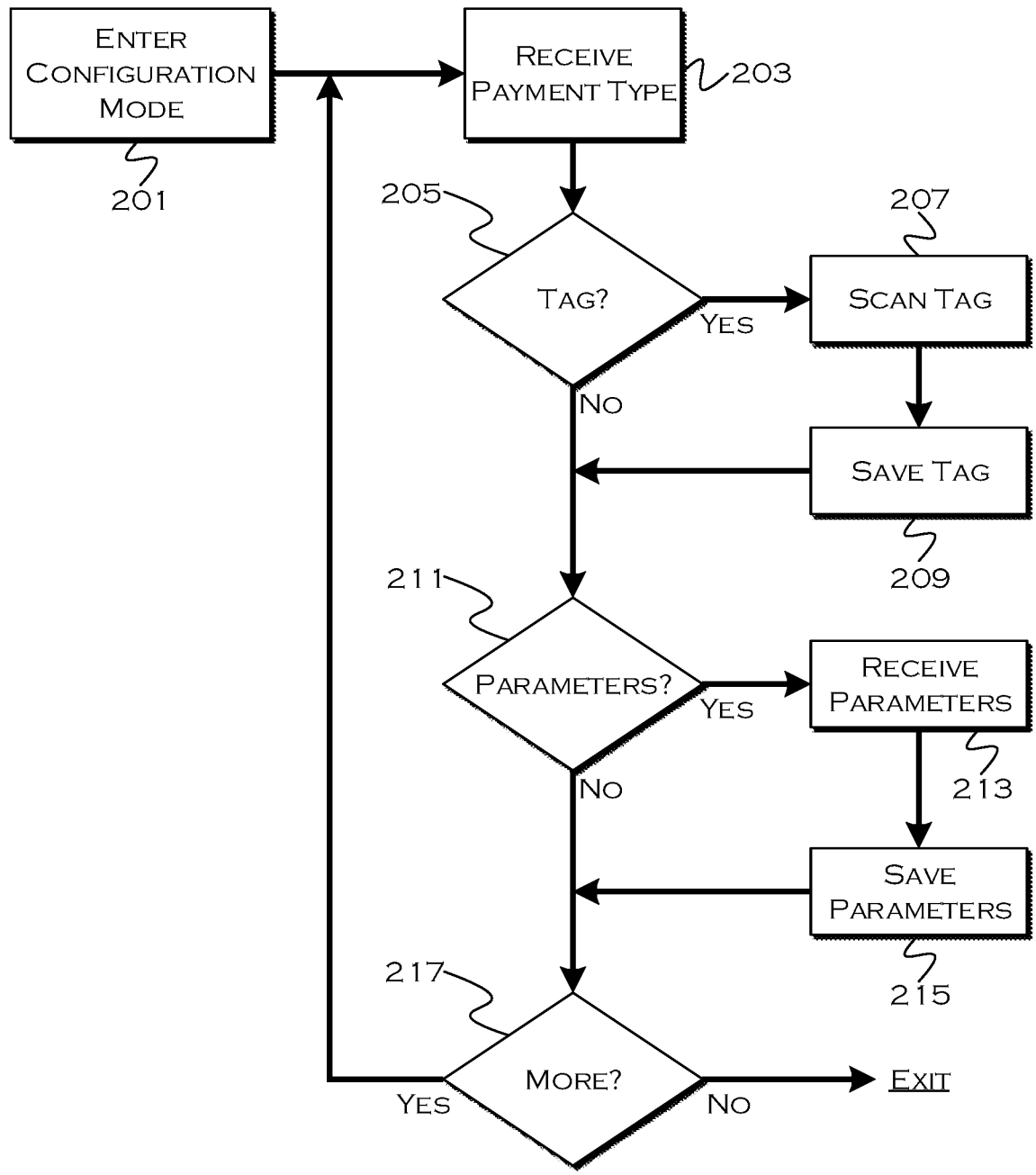
FIG. 2 shows an illustrative process for payment configuration.

FIG. 2 shows an illustrative process for payment configuration. This illustrative process allows a user to store data for multiple digital payment sources, including RF tags and credit cards (or other accounts). Virtually any account to which a toll can be allocated can be included in the configuration, and the vehicle (or a mobile device) can act as a middleman between the toll booth and the accounts. The illustrative examples presented herein can be, as previously noted, executed solely by or in combination of a variety of computing entities.

In the illustrative example shown herein, the process enters 201 a configuration mode at the request of a user. This allows designation of payment types and/or allocation of parameters to a payment type, defining when the particular payment type should be used.

Once in the configuration mode, the process receives 203 entry of a first payment type, such as a credit card number, identification of an RF tag, or designation of an online account (e.g. PAYPAL or the like). If the account is for an RF tag 205, the process may have access to an RF scanner that can scan 207 a proximate tag and save an identifier corresponding to the tag. In other examples, the process may simply receive account data for the tag, and save the account data for use whenever the tag is assigned to be used (even if the tag itself is not used). In still further examples, the process may not be able to scan the tag, but may accept identification of the tag for payment allocation purposes, such that if a user designates the tag for a given payment, the system will not attempt to process a default or other form of payment for a given toll. If the process is capable of scanning tag information and reconveying the information to a requesting booth, the process can scan and save 209 the tag information.

In another example, each toll tag company provider could provide an application or an identifier directly to the vehicle. This identifier could be used when payment via the particular tag is specified. If an application is downloaded, payment via the specific tag could be handled on-board by interaction between the vehicle (reading the requisite payment information) and the application (processing payment and instructing the vehicle to send back any necessary information to a toll booth).

If the process is not a tag, then the user will have entered account data (login/pwd, account number, etc) when identifying the payment information, and the system will be capable of saving that non-tag digital payment source as well.

The user also has an opportunity to associate certain parameters 211 with a given payment. For example, if a user has a tag or company credit card or account to be used during business hours, the user may designate parameters of Mon-Fri, 8 AM-6 PM for using the business account when encountering tolls. As can been seen later, the user can dynamically adjust these parameters to accommodate temporary changes (a day off, or working late or on a weekend, etc), but the user can define the parameters to address typical default settings if desired.

The process receives 213 the parameters, which illustratively include times, days, certain geographic regions, certain toll roads, etc., and saves 215 the parameters with respect to a given account. If the defined parameters overlap with other defined parameters, the process may ask the user to resolve any ambiguity. This configuration process can continue until there are no more 217 payment sources to enter.

Users can also enter or select "currency" as a payment source, when the user will be using currency to pay. This can avoid having the user incur double charges with respect to certain tolls. Depending on how the toll payment is determined, the user may be double charged if the user pays in currency and does not indicate the payment type. For example, if the process described herein were executed in a secure manner by a middle-man party, then GPS coordinates could be used to trigger payment, removing the need for RF scanning and communication, but in that instance the user might want to note when currency is used for payment to avoid a default digital account being charged as well.

Figure 3:
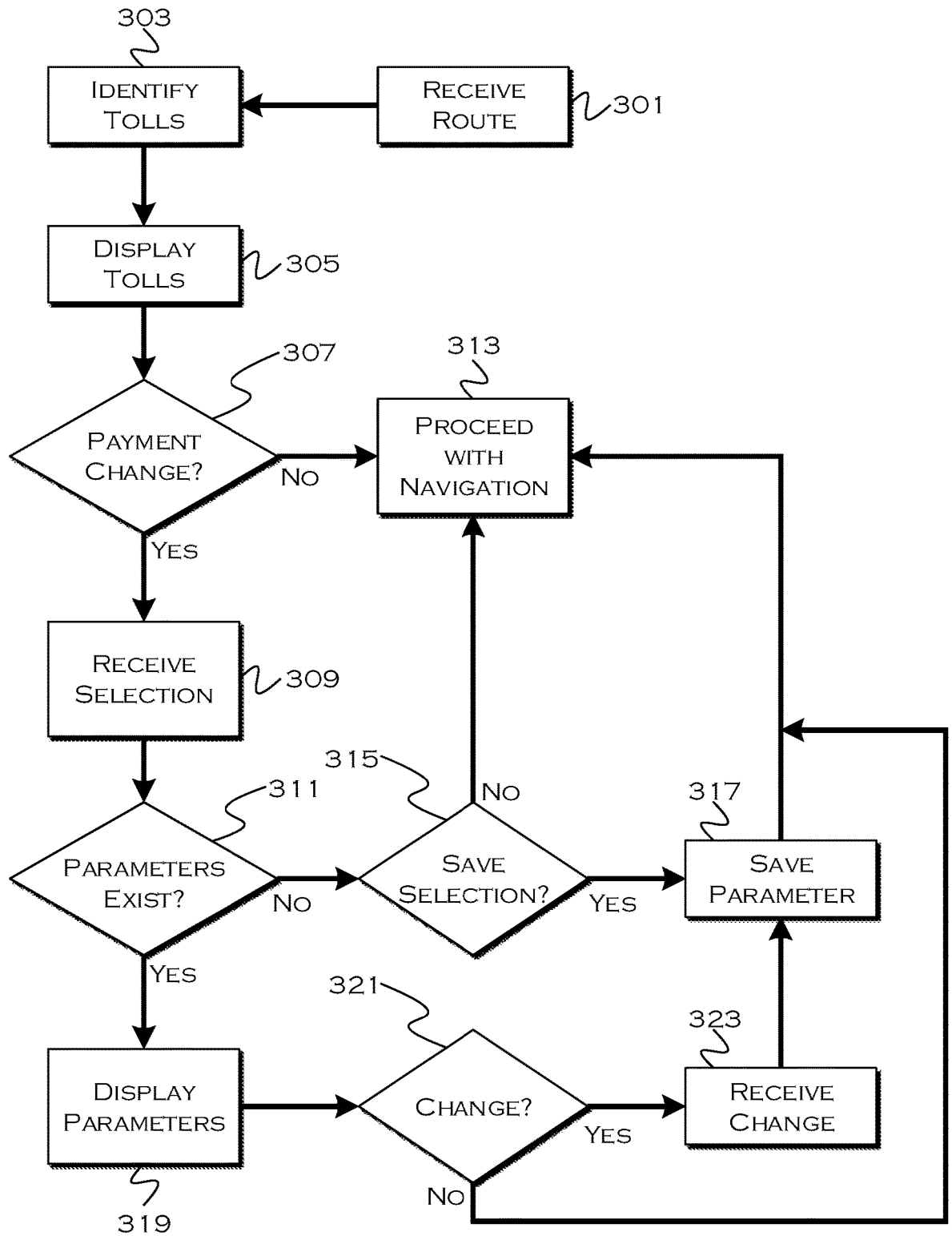
FIG. 3 shows an illustrative payment planning process.

FIG. 3 shows an illustrative payment planning process. In this example, the user will preassign payment solutions for some or all of a route. The route may initially show up with predesignated payment solutions based on any existing parameters, but the user can use this option to change payment sources, or define sources for any identified tolls that lack a payment designation. In this example, the process receives 301 a navigation route that includes one or more toll roads.

The process identifies 303 which portions of the route are on toll roads, and displays 305 estimated toll charges. By displaying the estimated toll charges, which is not a necessary step, but may be a useful one, the process allows the user to determine if the user can afford to use the toll roads or not. Many instances of toll roads have alternative routes that may be cheaper, but which may take longer to travel. The user can balance time against cost when the user is able to see the projected toll prices.

In this example, the process also displays the designated forms of payment for some or all of the tolls, if any defined parameters designate a particular payment source. If there are not any parameters for a given source, the process may use a designated default payment, or may have no payment option at all. The user can change 307 any particular payment source as needed. If the user is content with the chosen payment options presented, the process can proceed 313 with navigation.

If the user does need to designate or change a payment source, the process can receive 309 a selection of a particular payment source for use in paying a designated toll. If that source has associated parameters 311, then those parameters did not correlate to the selected road, for whatever reason, or the payment source would have been pre-designated. Thus, the process can give the user the option to save 321 the new selection of payment for future usage with that road. The process may display the current conditions that correspond to a new parameter, and the user can select 323 and save 317 a new parameter definition. As part of the saving process, the process could also display 319 the old parameters that are being changed.

If the payment source has no current parameters, the process can also offer 315 an option to assign parameters, again displaying the new parameters that would be associated, receiving any user changes, and saving 317 the parameters with respect to the payment source.

For example, a user inputs a destination with 3 toll roads, A, B and C. The route is traversed from 5:00 PM to 7:30 PM, and the user has defined work-related payment sources for travel before 6:00 PM. In this instance, the user has a new schedule, which requires the user to begin working until 7:00 PM. In accordance with the previous parameters, road A is assigned a work-related payment source P1. P1 has parameters of Mon-Fri, 8:00 AM-6:00 PM associated therewith. Road B, exited at 6:02, has no payment source, because the exit is outside working hours for P1. The same is true for Road C, which will be traveled from 7:05 PM-7:25 PM as the user heads home.

The user may designate use of P1 for Road B, and P2 (a personal source) for Road C. When the user designates P1, the process may ask the user if the parameters (Mon-Fri, 8:00 AM-6:00 PM) associated with P1 should change to reflect the new usage—the user can responsively affirm the change and select the new parameters, without changing the day of week, but changing the stop (and start, if desired) time to 7:00 PM. The process may also ask if the user will designate parameters for P2, which has no current parameters, but in that case the user may decline, preferring to have various options outside work hours, which are designated on a use-by-use basis.

It is worth noting that virtually any reasonable variable detectable by a vehicle and/or predictable by a vehicle could be designated as a parameter, which could include, for example, but is not limited to, geographic regions, certain roads, journey start times, journey end times, even certain traffic conditions and similar variable situations. It is even possible to split payment sources in a designated manner if desired, which could be useful if a group commuted together or if a group of people were using a shared vehicle or autonomous vehicle. It is further possible to save payment choices with respect to a user account, and if the vehicle can identify the user (such as through detection of a user device or other user recognition), the vehicle can load associated payment choices and parameters from a user profile.

Figure 4:
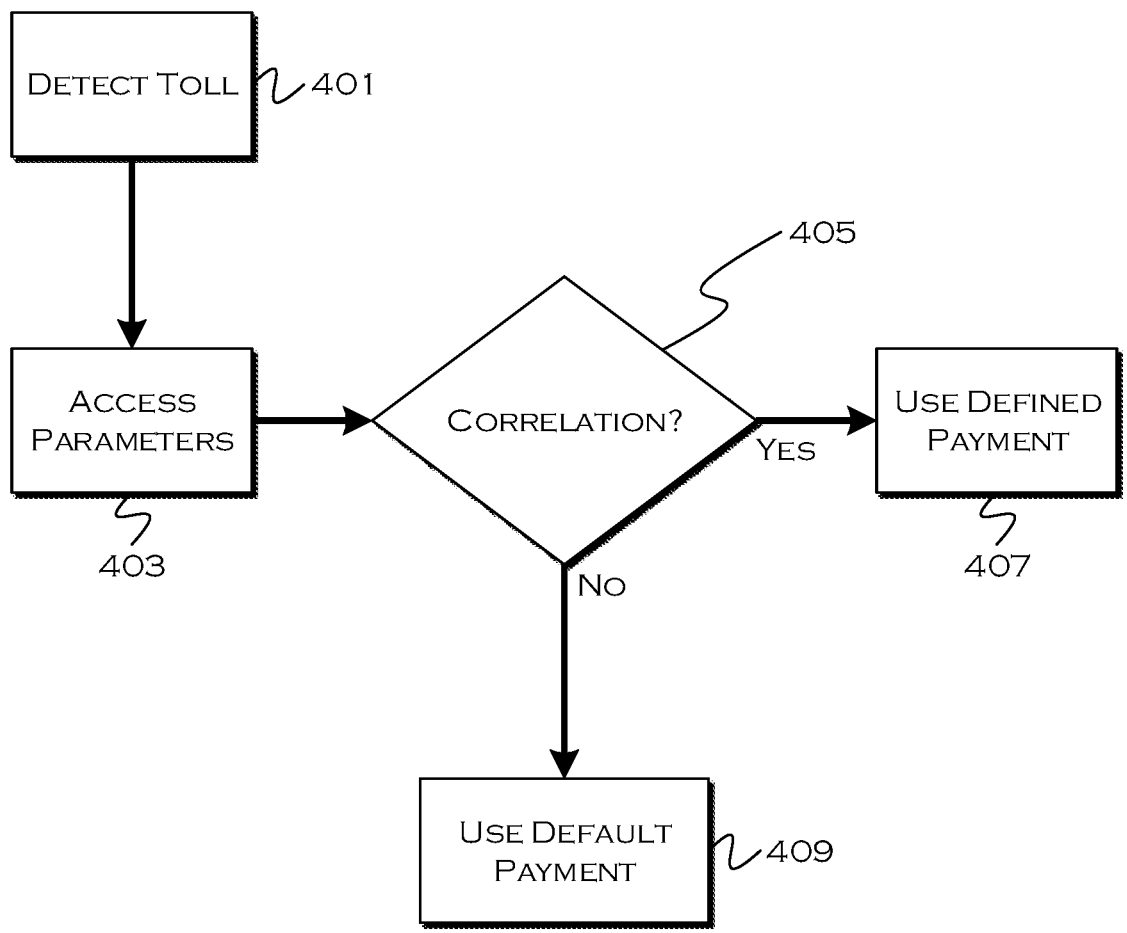
FIG. 4 shows an illustrative payment process.

FIG. 4 shows an illustrative payment process. In this example, the process detects 401 a necessary toll payment through any number of reasonable means. This could include, for example, RF identification or even GPS coordinates traveled by the vehicle. Toll companies may not have an issue with the vehicle self-defining toll road travel, as long as the companies are confident in the system's ability to effectively collect tolls. The process can, responsive to detecting the toll payment request, access 403 any default or predefined payment options associated with the particular toll or situationally associated by parameters.

If there is a correlation 405 between the toll/time request and any parameters, the process may use 407 the payment defined by the correlated parameters. In other instances, the process may use 409 a default set of parameters.

Through use of the illustrative embodiments and the like, toll payment systems can be effectively provided and managed, and users can plan and define payment solutions in advance of travel, allowing the user to travel any route without having to stop or slow for tolls unless traffic otherwise dictates. This can streamline the payment process and allow users to effectively manage both work-related and personal payment sources.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
receive a navigation route;
identify a plurality of toll instances on the navigation route prior to arrival at any point where a toll is due for any toll instance;
display the plurality of toll instances with a preferred payment for each instance method on a display, responsive to identifying the instances, prior to arrival at any point where the toll is due for any toll instance, and with an option to select an alternative pre-saved payment method for each instance;
detect when a vehicle travels past a point where a toll is due for a given instance; and
wirelessly instruct payment of the toll due for the given instance using the preferred payment method or the pre-saved method based on a user response to the display of the toll instance.

2. The system of claim 1, wherein the processor is configured to determine the preferred payment method based on a parameter associated with the payment method.

3. The system of claim 2, wherein the parameter includes a time of day.

4. The system of claim 2, wherein the parameter includes a day of week.

5. The system of claim 2, wherein the parameter includes a geographic area including the toll instance.

6. The system of claim 2, wherein the parameter includes a road to which the toll instance corresponds.

7. The system of claim 1, wherein the processor is configured to detect when the vehicle travels past the point based on a wireless signal received from a transmitter associated with the toll instance.

8. The system of claim 1, wherein the processor is configured to detect when the vehicle travels past the point based on GPS coordinates.

9. The system of claim 1, wherein the processor is included with a vehicle computer.

10. The system of claim 1, wherein the processor is included with a mobile device.

11. The system of claim 1, wherein the identification occurs when a route is input.

12. The system of claim 11, wherein the display occurs responsive to identifying the instances on the route that was input, substantially proximate to a time when the route was input.

* * * * *